Patented Feb. 27, 1945

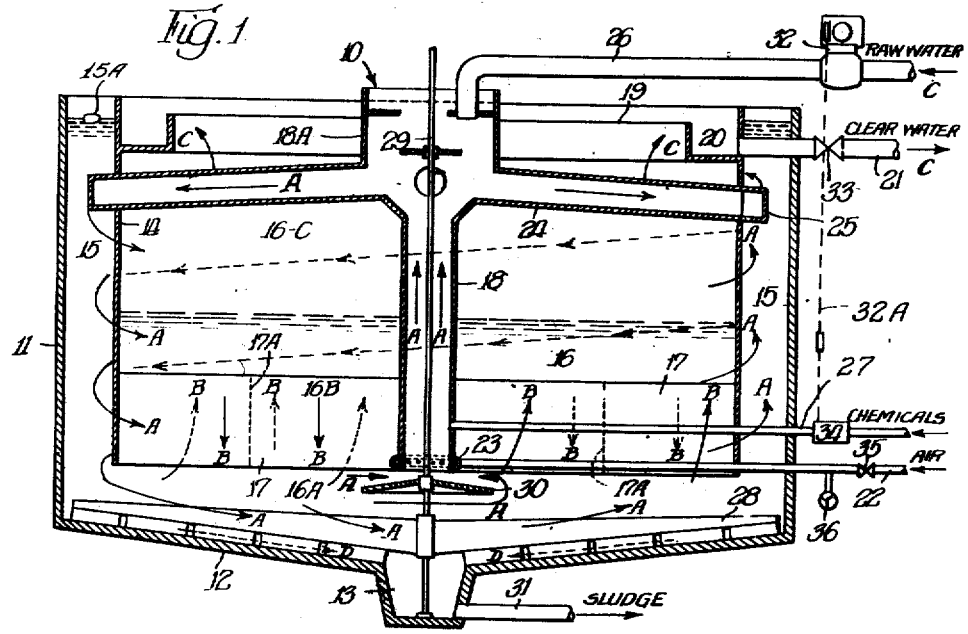
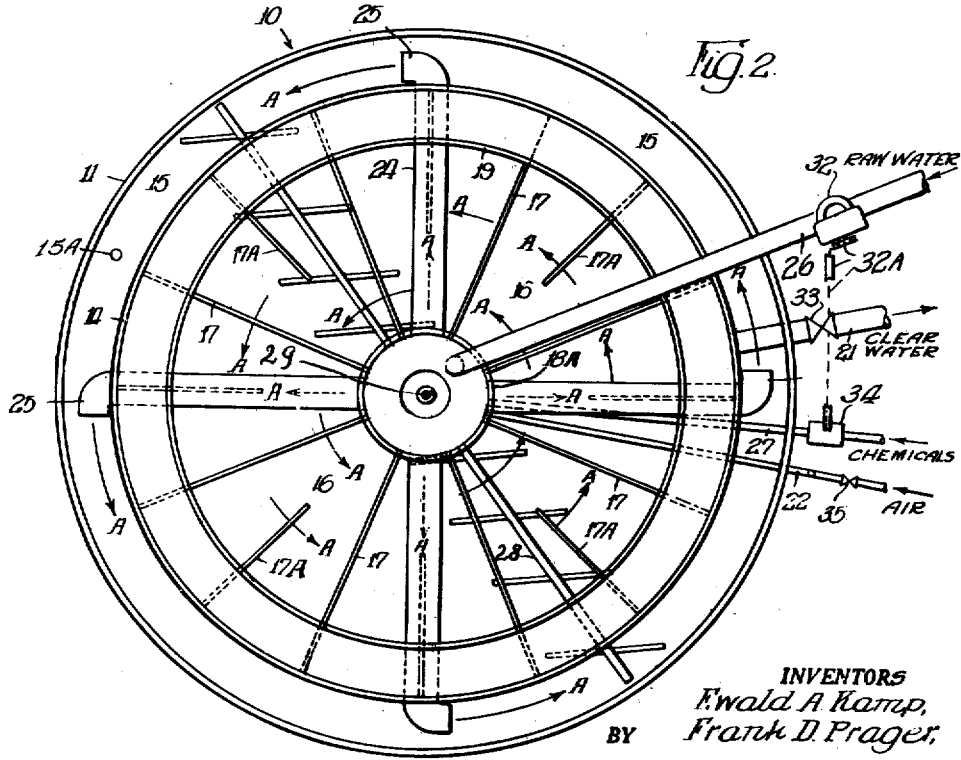

2,370,356

UNITED STATES PATENT OFFICE 2,370,356

LIQUID TREATMENT

Ewald A. Kamp and Frank D. Prager, Chicago, Ill., assignors to Graver Tank & Mfg. Co., Inc., a corporation of Delaware Application March 22, 1943, Serial No. 480,126

2 Claims. (Cl. 210—16)

This invention relates to the treatment of aqueous liquids, such as water, sewage and the like, wherein impurities are precipitated, that is, made settleable in form of a suspended sludge, portions of the suspended sludge are accumulated to form a sludge bed or blanket, and the liquid is filtered through this bed or blanket of accumulated suspended sludge. The treatment contemplated takes place in the cold, that is, without any of those liquid heating operations which are usual in the hot process of water softening, in the clarification of sugar juice, or the like. We use alum, lime, soda, or other standard precipitating reagents, which may either be present in, or added to the water. In some cases we may add auxiliary substances, such as sodium silicate, or some bicarbonate, or possibly a chemically neutral agent such as clay, or various adsorbent materials. The materials used or added, in our process, are selected in well-known manner, so as to produce the most settleable sludge particles in the shortest possible time and with the lowest possible expense for chemicals. The sludge produced consists generally of flocs composed of small particles of calcium carbonate, magnesium hydroxide, aluminum hydroxide, or the like, precipitated in the water or similar liquid, and which may or may not be agglomerated with suspended matters, or modified by auxiliary substances.

We have more particular reference to a treatment as aforesaid, which includes the steps of: maintaining an upflow sludge filtration zone, circulating liquid and sludge so as to produce a substantially horizontal rotation thereof throughout the lower part of the sludge filtration zone, and stopping this horizontal rotation in a superposed part of the sludge filtration zone. A sludge of the character as defined above is accumulated, in suspension, in the lower part of this upflow sludge filtration zone, forming the sludge bed or blanket. Thus the sludge filtration zone has an upper part where the purified water rises to an outlet means, and a lower part where the water rises through the accumulated sludge bed. This sludge bed, in turn, has an upper part, substantially without horizontal rotation, and a lower part where considerable horizontal rotation prevails.

The general features of our process, as indicated above, are known to the art. Various theoretical proposals have been made, embodying these several zones, movements, and conditions. There are also some devices in actual use which make use of these general principles. Our invention provides improvements over these earlier proposals and devices.

We found that for best results, certain design or control features must be applied. We found that no good sludge bed and filtration can be produced by merely applying horizontal rotation in the bottom zone and stopping the rotation in a higher zone. Improved results are obtained when using, in connection with the aforementioned steps, in a sludge filtration zone of cylindrical shape, certain vertical circulations of liquid and sludge, superposed over the horizontal rotation and cooperating to stop the same.

These as well as a number of additional features of our invention will be particularly described in connection with a process and apparatus for clarifying a turbid water. It was in connection with such clarification that our discovery was made. The invention, however, is applicable in other connections as well. It has for an object, to accelerate the treatment of liquids as generally referred to, and to render this treatment, and apparatus for same, more efficient as well as more economical.

A special object is to make results more independent of fluctuations in the flow of the liquid to be treated. Heretofore, such fluctuations were one of the greatest sources of trouble in this field.

A general object of our invention is, to provide a rapid, efficient and economical liquid treatment which is free from the uncertainties due to fluctuating rates, the difficulties of control, the excessive fluid friction, and other drawbacks of earlier treatments.

In the drawing,

Fig. 1 is a sectional elevation of apparatus embodying this invetnion and wherein the process of this invention can be carried out; and Fig. 2 is a plan view of the apparatus of Fig. 1.

The tank 10 has a cylindrical wall 11 and slightly inclined bottom 12, with a central sludge sump 13. A cylindrical partition 14 is concentrically installed in the tank, and extends from the top thereof to above the bottom 12, forming an outer flocculation chamber 15 and an inner sludge filtration chamber 16 in the tank. Vertical baffles 17 extend radially from the inside of the partition 14 through the sludge filtration chamber 16, above the bottom 12, to a central air lift tube 18. A similar but shorter baffle 17—A may extend between every pair of baffles 17, from the partition 14 to a point about half way to the tube 18; such shorter baffles being inserted mainly in relatively large tanks. The tube 48 extends from above the bottom 12 and sump 13 to the top of the tank, and preferably a slight distance above the top of the tank. The top liquid level in the tank itself is determined by the weir 19 of a launder 20, carried by the top of the partition 14. Treated liquid is withdrawn from this launder through the effluent pipe 21. The top liquid level in the air lift tube 18 is slightly above the weir 19, due to the liquid lifting effect of the air. This air is blown into the tube 18 from a suitable source, not shown, through the pipe 22 and the air diffuser 23 which is installed at the end of the pipe 22 and located in the lower part of the tube 18. A plurality of conduits 24 radiate from an upper, preferably enlarged part 18—A of the air lift tube 18 to the top part of the flocculation chamber 15, spanning an upper part of the sludge filtration chamber 16. These conduits 24 terminate in liquid inlets 25 of the flocculation chamber 15, discharging in tangential directions, so as to cause a horizontal rotation of liquid and sludge in the flocculation chamber 15.

When the tank 10 is filled with water up to the weir 19 and then some air is blown through the pipe 22 and distributor 23, there is produced a movement or circulation of the water within the tank, which comprises the following flows: a primary circulation through the tube 18, the conduits 24, the flocculation chamber 15, and a lower part 16—A of the sludge filtration chamber 16, below the radial baffles 17 and 17—A; and a plurality of secondary circulations in the superposed part 16—B of the sludge filtration chamber 16, above the bottom edges of the radial baffles 17 and 17—A. These parts or zones 16—A and 16—B are indicated in Figure 1. The figure also shows a part or zone 16—C at the top of the sludge filtration chamber 16. This zone 16—C can be identified as that part of the zone 16—B for secondary circulations which in operation is free from sludge entraining or suspending velocities of said secondary circulations, and therefore free from suspended sludge, as hereinafter explained. It must be expected, of course, that the boundaries between the three zones 16—A, 16—B (lower part) and 16—C, in actual operation, fluctuate within certain limits; however, they are generally located and defined as indicated above, and said fluctuations are much more limited, in accordance with this invention, than in earlier processes.

The primary circulation A of the water is produced by the rising and the liquid impelling effect of the air in the tube 18. This primary circulation leads upward through the tube 18, outward through the conduits 24, spirally down with largely horizontal rotation through the flocculation chamber 15, further spirally, inwardly and largely horizontal rotatingly through the bottom part 16—A of the sludge filtration chamber or zone 16, below the radial baffles 17, and finally back into the air lift tube 18, all this substantially as shown by the arrows marked A.

The secondary circulations B of the water in the zone 16—B are produced by the horizontal rotation of the water in the zone 16—A, owing to the fact that each baffle 17 and 17—A extends radially of the tank, that is transversely of the rotary direction of flow of the circulating water, and upwards from such rotating water in the zone 16, and deflects some of this rotating water. One part of each deflected, secondary circulation B leads upward in front of each radial baffle 17 and 17—A, in the form of a broad band of rising water. It leads similarly downward through the rest of the sector-shaped cell or chamber, formed between a pair of radial baffles, wherein this band of a secondary upward flow has been produced. Thus it may be said that such a secondary, vertical flow B leads upward in front of each baffle 17 and 17—A and downward behind each of said baffles.

The amount of any primary circulation A prevailing in the tank 10 is, of course, hydraulically independent of any input or throughput flow of liquid to be treated. In operation, however, such a throughput flow C is added, preferably through the inlet pipe 26 discharging into the top part 18—A of the central air lift tube 18. Any chemical reagents required to precipitate impurities of the liquid in form of a sludge are preferably added through a pipe or pipes 27 discharging into a lower and prior part of the upflow in the air lift tube 18. Treated water is withdrawn from the launder 20 through the pipe 21, which launder and pipe form an outlet means for the throughput flow C. Between the inlet 26 and the outlet 20, 21, the through-put flow passes through the tanks in intimate admixture with the aforementioned circulating flows. As mentioned before, the through-put flow should always be relatively small as compared with the circulating flows, regardless of changing through-put rates. This insures that a substantially proper degree of sludge suspending energy is always available even at times of slow through-put flow; it also insures that the through-put liquid is always well distributed through the sludge filtration zone, and continuously mixed with the sludge and treated liquid in the said primary and secondary circulations, at times of slow or rapid through-put flow. Thus the whole through-put flow is forced to follow the aforementioned path of the primary circulation A, and every portion thereof is engaged by a secondary, vertical circulation B at least once, before it can be withdrawn through the outlet 20, 21.

The particles of sludge which are formed in the process settle to the bottom 12 if and when they attain sufficient size or weight to settle against the liquid commotion in the zones 15, 16—A and 16—B. The sludge is then collected as shown at D, by slowly rotating sludge scrapers 28, which are driven by a motor-reducer, not shown, through the vertical shaft 29, extending through the air lift tube 18. The collected sludge is finally received in the sump 13. This sump is protected from any disturbance that would arise due to the circulation prevailing under the air lift, by a baffle or tray 30 slowly rotating with the scrapers. The sump is periodically or continually emptied of sludge through the pipe 31, by a pump or a valve-controlled gravity means, not shown.

It is, of course, desirable to design and operate the tank so that the throughput flow C can, if necessary, be as rapid as possible. Desirable limits for the rates of rise in the zone 16 are between about 1 and 3 inches per minute, in the clarification of most waters. At the same time, the most efficient and the most economical treatment should be applied to the water, for removing the impurities. This requires sludge filtration in the zone 16. Again, in order to apply efficient sludge filtration, a sludge bed must be kept suspended in the zone 16. However, a rising rate of 1 to 3 or even 6 or 9 inches is insufficient to keep a bed of heavy sludge in suspension. Thus, said circulations must be added. Especially said secondary circulations B are of paramount importance for maintaining a proper sludge bed. The radial, vertical vanes 17 and 17—A must not act merely as "stilling baffles"; they must be designed and mainly installed so as to act as deflecting members generating said very vital, vertical circulations, rather than "stilling" all circulation within the zone they occupy.

We are referring to "stilling" vanes if the vanes are so arranged and constructed as to enforce substantial quiescence of the water between said vanes, except for such slight agitation of said water as may be due to any upward throughput flow. In contrast, we are referring to "deflecting" vanes if the vanes are so arranged and constructed as to allow, substantially throughout the zone between said vanes, continued liquid movements at substantially more rapid rates than are due to any upward throughput flow. Such continued, circulatory, deflected, liquid movements, between and sometimes even above the vanes 17 and 17—A, are actually allowed in accordance herewith; they are identical with said secondary, vertical circulations B. Their upward and downward velocities, in accordance herewith are very substantial indeed, generally being equal to many times the maximum upward throughput velocity; and as a result we provide, between the vanes 17 and 17—A, upward filtration of the throughput flow through a very distinctive, turbulent type of sludge bed, not through a quiescent blanket. Whether a set of vanes belongs to the "deflective" type, as proposed, or to the "stilling" type, according to these definitions, depends on a number of well-known factors, including: The direction and velocity of the primary circulation A in the zone 16—A, below the vanes; the viscosity of the liquid in said zones 16—A; the distances between the vanes 17 and 17—A in the direction of the primary circulation A; the angle of impact of the primary circulation A on the vanes 17 and 17—A; the height of the vanes 17 and 17—A; the design and construction of the surface of the vanes 17 and 17—A; and other more or less important features of arrangement and construction.

In an upwardly expanding sludge bed zone, or in one for downward rather than upward flow, said secondary, vertical circulations B may perhaps be dispensed with. In our process, they are absolutely required, and must have substantial volume.

We found it necessary, then, that the primary circulation A be maintained so as to generate the most efficient secondary circulations B. The primary circulation A also raises desirable amounts of sludge from the bottom zone 16—A to the top of the flocculation zone 15, and causes desirable agitation in the latter zone. At the same time the primary circulation is controlled so as not to be so rapid or violent that excessive energy would be required for blowing air through the tank, or excessive breaking up of the sludge particles would result in the relatively restricted portions or ducts 18, 24 and 25 through which this circulation passes.

The tank 10 and its various parts must be constructed and designed accordingly. Typical dimensions and flow rates will be stated in the following, which apply to a treatment of water with alum flocs, for removal of turbidity.

In no part of the tank 10 do we allow a flow velocity in excess of 3 feet per second. However, we may approach said velocity of 3 feet per second, although we preferably apply flows at about 5 to 20 inches per second, in the ducts 18, 24 and 25 where the necessary, primary, rotary motion is generated; and the primary, rotary motion which prevails adjacent the generating devices therefor, in the top of the zone 15, may be but little slower.

A gradual decrease of this rotary velocity is unavoidable, incident to the downward spiralling of the water in the zone 15, its turning and entering into the bottom zone 16—A, and its inward passage towards the bottom inlet of the air lift tube 18. Also this decrease of rotary velocity is desirable; it produces what may be called a tapered coagulation. Considerable energy is consumed as the circulating fluid issues from the openings 25 and accelerates the mass of material in the zone 15. Therefore, if this fluid flows through the openings 25 at about 20 inches per second, the flow velocity of the material in zone 15 adjacent these openings will be generally about 8 to 16 inches per second, more or less, depending of course on well-known details of hydraulic design and construction. Such a speed of about 8 to 16 inches per second is very desirable for incipient coagulation, and also for the re-coagulation of particles broken up in the more rapid parts of the circulation. The power of the circulating fluid is applied in tangential, horizontal directions at 25, but the peripheral wall 11 confines the liquid and deflects the flow into a path having a major circular, horizontal component. Another component of the path of liquid in zone 15 is a downward one, due to the continuous circulation A. The amount of the primary circulation A is of course uniform in all zones through which it passes. The total or overall velocity thereof is a function of its amount and of the flow area at each point. The rotary velocity thereof, at each point, is a function of this total or overall velocity, at the respective point, and the aforementioned decrease of rotational velocity up to the respective point. The said deflection of the tangential stream into a circularly spiralling one is conducive to eddy formation, in addition to eddies previously formed in and past the openings 25. Additional eddies are formed throughout the zone 15, by skin friction of the water along the wall 11 and partition 14 and inner liquid friction between the several layers of water spiralling down through the zone 15, and of course again, incident to the inward turning over the bottom 12. As a result of all these eddies, coagulation occurs, and energy is consumed. If the total velocity is 8 to 16 inches per second and the circular velocity component perhaps 7 to 14 inches per second, in the top of zone 15, then the total velocity will generally be about 7 to 14 inches per second, and the circular velocity component perhaps 5 to 10 inches per second, more or less, inside of and adjacent to the bottom edge of the cylindrical partition 14. The circular velocity component approaches zero adjacent the central point where the air lift energy is applied; but in a major portion, such as 75% by area, of the zone 16—A, a circular velocity component of about 4 to 8 inches per second will prevail, under the above assumptions.

We found it very essential to maintain said velocity of about 4 to 8 inches. We can change velocities in zones 18 and 15 considerably, but in that event we must compensate so as to provide said critical velocity in zone 16—A.

Our figures as stated above are based on the use of relatively light flocs, formed by alum. Even when using lime and soda and producing a softening reaction, velocities such as those resulting from an average paddle speed of 1 to 2 feet per second, for instance, would be excessive, in our apparatus and process, which has no restricted inlet for the sludge bed zone, which uses a particular, light sludge bed material, and which provides sedimentation of sludge through the circulating flow. Said slower rate, when using alum, and a proportional, but still relatively slow rate when using lime-soda, not only produces a very high degree of coagulation, but also insures a very uniform and proper secondary circulation, suspending essential parts of the sludge, and allowing the rest to settle.

It is possible to compensate for said decrease of rotational velocity, or even to increase the rotational velocity component. However this is generally unnecessary, or even undesirable due to the increase in overall or total fluid friction, and floc break-up, that would be caused if necessary overall amounts of material were circulated.

The secondary circulations B are essential for maintaining the suspended sludge bed, in the zone 16—B. For this purpose, these secondary circulations must include vertical flows of sufficient area and velocity to entrain, against inherent settling tendencies, sludge particles ranging up to considerable size and weight. Such relatively rapid flows, however, must still allow sedimentation of the heaviest sludge particles, and must be confined to a zone 16—B located sufficiently far down in the tank 10 to prevent local or general boilups or carry-overs of any sludge of intermediate weight into the superposed clearwater zone 16—C, adjacent the effluent launder 20. This in turn means that the lower edges of the baffles 17 should be located in a lower portion of the tank, preferably as close to the bottom of the tank as is possible; if necessary, they may just miss the slowly rotating scraper structure 28, or they may rotate with the same. Also, a zone 16—B and 16—C of substantial depth must be provided; generally both parts, 16—B and 16—C, will be deeper than the zone 16—A for horizontal rotation. Further, the aforementioned flows B of the secondary circulations must be substantially uniformly distributed over the area of the sludge filtration zone 16. For this purpose the baffles 17 and 17—A are uniformly spaced from one another, peripherally, so as to form between themselves compartments or cells of such design that said circulating flow A, at such rotary velocity as it retains in the zone 16—A, may require only a few seconds, at the most, to traverse the angular distance from one to the next baffle, so that it cannot gain too much momentum in any parts of said compartments or cells, and the local rising flows may not be excessive. Finally, the vertical flows B serve the purpose of dissipating and stopping, in controlled vertical rotations of liquid, the circulatory and agitative energy originally applied by the air lift, and which was not previously absorbed, as described. Thus we prevent any swirl, floc entrainment, and other defects in the clear water zone 16—C; and we also allow sedimentation of relatively large sludge particles in and from the zone 16—B.

The aforementioned circular velocity component of 4 to 8 inches per second below and adjacent the bottom edges of the baffles 17 and 17—A is conducive to upward circulating flows at about 3 to 6 inches per second velocity, more or less, adjacent the same points. If the liquid and solids present were all of the same weight, such upward flows might, undesirably, reach a very elevated point in the zone 16. Actually, however, the relatively high specific gravity of the sludge causes the branching off and subsiding of sludge and liquid portions; this causes a rapid, upward decrease of said rising velocity; and this, in turn, means that the remaining, rising flows lose more and more of their ability to suspend the remaining sludge particles, all of which have attained at least some settleability after their rotation in zone 16—A and after some vertical rise and sludge filtration in zone 16—B. We found that even when intentionally producing boil-ups of sludge, by doubling the rate of circulation A, or increasing it still more, the rising velocity of the sludge boiling up into or through the clear-water zone would hardly, if ever, exceed about 1 inch per second, at a point a certain number of feet above the bottom edges of the baffles 17 and 17—A, at which point said rising speed could be observed conveniently. Even in normal operation, the secondary, vertical circulations may not be said to be entirely absent from the clear water zone 16—C, but the velocity thereof, in said zone, approaches zero, and is at any rate insufficient to move sludge particles from the top of the sludge bed into this clear water zone. However, throughout the zone 16—B, we maintain vertical flows at average rates of about 1 or 2 inches per second, that is, much more rapid than the design rate of rise of the throughput flow.

It will be noted that our sludge bed is not stationary, but is subject to said horizontal rotation in its lower part, and to said vertical circulations in its upper part. Each of said movements is gentle enough to produce coagulation, and simultaneously to allow sedimentation of the very heaviest sludge particles resulting therefrom.

Sludge particles of considerable weight and size are kept suspended in the cylindrical zone 16—B, by combined effects of the upflow through the same and mainly of the secondary circulations therein. In the zones 15 and 16—A and possibly at the bottom of zone 16—B, where smaller and lighter sludge particles, including those in a nascent state, are present, these smaller particles are actually entrained by the circulating flows, or even by a throughput flow alone, and thereby carried into the sludge bed, to be deposited on particles previously formed. Thus successive portions of the articles previously suspended grow to even greater size and weight. At such greater size and weight they are no longer kept suspended by our vertical flows of the controlled circulation B, with or without any constant or fluctuating throughput flow C. Even less are these heaviest particles kept suspended by the underlying horizontal rotation of the circulation A. These large and heavy particles accumulate on the bottom 12. Here, they may still be subject to some horizontal rotation, due to the flow in the zone 16—A; but since these particles are large and heavy, they are no longer fully entrained, and much less resuspended; merely a top layer thereof, above the scrapers 28, may be rolled around slowly, if such a depth of settled sludge is ever allowed to accumulate. The scrapers merely have to sweep the settled sludge into the sump 13.

The movement D of the settled sludge, on its way to the sump 13, should be just rapid enough so that the settled sludge can be removed at the rate at which it accumulates. In some cases our scrapers or sludge impellers 28 can be rotated at a higher speed than that which causes such removal of settled sludge. This, however, will entrain water with the sludge removed, and will also complicate the necessary control over the speed of the horizontal rotation of liquid and sludge in the zone 16—A. Therefore, no such rapid rotation of sludge impellers enters our preferred design and process. We generally limit the peripheral speed of the scrapers to five to ten feet per minute at the very most. Such a slow moving scraper actually functions as an additional vertical baffle; the water rotates much more rapidly above the same, and suspends the light sludge which may be present behind the scraper, while not seriously affecting the heavy, settled sludge shifted in front of the scraper.

In a specific example of tank design and operation according to this invention, the following data apply, which can be ascertained by simple devices. (Various throughput velocities of liquid under treatment are measured by a flow meter 32 in the inlet pipe 26, and are adjustably controlled by an automatic control 33 in the effluent pipe 21. The amounts of chemical reagents added are adjustably proportioned to the liquid flow rate by an automatic proportioner 34, controlled by the meter 32 by any suitable transmission device 32—A. The amount of air used, and its pressure ahead of the distributor 23, are manually regulated by a valve device 35 and measured by gauge means 36. Observations are made as to the velocities of the horizontal rotation of liquid in various parts of the flocculation chamber 15, by means of small floats 15—A freely floating on top of the flocculation chamber, and the like. Further careful observations must be made as to liquid levels, flow velocities, directions of flow, temperatures, amount and character of solids present in the water, and other factors, in all parts of the tank.)

A river water containing between 30 and 300 P. P. M. of suspended matter, largely organic and partly tending to float when coagulated, was treated with alum, in a tank 10 having zone 16 of 250 square foot area. The alum formed flocs by reaction with bicarbonates, sufficient amounts of which were present in solution in the water. The raw water had a pH between 7.2 and 6.7 and a temperature of about 70° F. The said suspended matter was safely and continually—not merely in the average—reduced to less than 10 P. P. M., and generally to less than 5 P. P. M., in a throughput flow having a rising rate between .5 and 3.0 inches per minute.

We were also able to interrupt the throughput flow C entirely for periods as long as 36 hours, continuing the circulations A and B. On resuming the throughput flow C after such shut-downs, the same favorable results were obtained as recited above, even if the flow was resumed with a sudden shock, at the highest of said rising rates.

We obtained said results with a feed of alum at a ratio of only about 1.5 grains per gallon of water treated. Only in rare instances did we have to increase this chemical feed, for limited times. Of course a sludge bed had to be built up initially. The sludge bed also had to be replenished after a prolonged shut-down of throughput flow, lasting more than 36 hours, with continued circulation. In building up or replenishing a sludge bed for a tank holding many thousand gallons, many pounds of chemicals had to be applied, and we conveniently accelerated that process by temporarily feeding chemicals at higher rates, such as 4 grains per gallon.

It will be understood that the above data have to be modified when different treatment problems are encountered. For instance, when a heavier floc of calcium carbonate is produced, somewhat more rapid circulations are necessary and proper, and it is possible, but not necessary, to apply more rapid throughput flows. It will be understood, further, that the circulating velocities as stated depend on additional factors, including mainly, among others, the temperature of the water, and its resulting viscosity. Necessary modifying computations can be made quite readily, within the required accuracy, by persons skilled in the art, on full consideration of this disclosure.

The use of an air lift 18, 23 for circulating the water has a number of advantages. Control of the circulating velocities is simply and accurately effected by means of the air valve 35. A plurality of distributors 23 can be provided in a large tank, without undue expense or complications. The air applied is also useful in that it drives off carbon dioxide and other gases which make the water corrosive and inhibit the precipitation of certain salts. In the aforementioned example, we found that the original pH never dropped below 6.3 and generally not below 6.7. Only in rare cases may the addition of air be slightly objectionable; for instance where the feedwater for a boiler must be treated and no deaerator is available.

We claim:

1. Liquid treatment apparatus comprising a substantially cylindrical tank, a substantially cylindrical partition concentrically installed in said tank, forming a sludge filtration chamber inside and an annular flocculation chamber outside said partition, and extending from the top to above the bottom of said tank, a plurality of substantially radial baffles extending inwards from said partition and extending upward from above the bottom of said tank in said sludge filtration chamber, a plurality of liquid inlets in the upper part of said flocculation chamber directed substantially tangentially thereof, means adapted to maintain a flow from the bottom part of said sludge filtration chamber to and through said inlets, portions of the liquid and sludge present in said bottom part of and thereby to produce spiral flows in said flocculation chamber and bottom part and vertical flows between said baffles, inlet means in said tank for passing liquid to be treated and any sludge precipitating reagents required into the liquid flowing to said inlets, outlet means for treated liquid at the top of said sludge filtration chamber, and slowly rotatable means for removing precipitated and settled sludge from the bottom of said tank.

2. Apparatus according to claim 1 wherein said means adapted to maintain a flow of liquid and sludge comprises an air lift tube concentrically installed in said tank, extending from above said outlet means to adjacent the bottom of said tank, air lift means associated with said tube, and a plurality of conduits spanning an upper part of said sluge filtration zone and leading from said air lift tube to said tangential inlets.

EWALD A. KAMP.
FRANK D. PRAGER.

CERTIFICATE OF CORRECTION.

Patent No. 2,370,356.   February 27, 1945.

EWALD A. KAMP, ET AL.

It is hereby certified that error appears in the printed specification of the above numbered patent requiring correction as follows: Page 1, second column, line 38, for "invetnion" read --invention--; page 4, second column, line 51, for "articles" read --particles--; page 5, second column, line 52, claim 1, after "part" strike out "of" and insert the same before "portions" in line 51, same claim; line 68, claim 2, for "sluge" read --sludge--; and that the said Letters Patent should be read with this correction therein that the same may conform to the record of the case in the Patent Office.

Signed and sealed this 12th day of June, A. D. 1945.

Leslie Frazer (Seal)   Acting Commissioner of Patents.